Patented May 28, 1935

2,002,533

UNITED STATES PATENT OFFICE 2,002,533

PROCESS FOR SEPARATION OF HYDROCARBONS AND THEIR OXYGEN-CONTAINING DERIVATIVES

Per K. Frolich, Cambridge, Mass., and James W. Pugh, Breckenridge, Tex., assignors to Standard Oil Development Company, a corporation of Delaware No Drawing. Application May 21, 1928, Serial No. 279,600

6 Claims. (Cl. 260—116)

The present invention relates to an improved process for obtaining valuable aliphatic oxygen-containing hydrocarbon derivatives and more specifically to a method for removing such oxygen-containing derivatives from their mixtures with normally fluid hydrocarbons. Our process will be fully understood from the following descriptions.

The present application is a continuation in part of a previous application Serial No. 226,076 filed October 14, 1927 by Per K. Frolich, now Patent 1,858,822, and entitled, "Process for treating hydrocarbon materials." The previous application disclosed an improved method for obtaining oxygen-containing derivatives from hydrocarbons by direct oxidation with air, particularly at high pressure, but in the process only a limited proportion of the hydrocarbons are converted into oxygen-containing derivatives and it is desirable to remove such derivatives from their mixtures with unoxidized hydrocarbons in order that the latter may be recirculated to increase the yield as will be understood.

We have found that methyl alcohol may be satisfactorily used to extract oxygen-containing compounds therefor such as alcohols, aldehydes, acids, etc. from their mixtures with normally fluid hydrocarbons but it is desirable to have present from 5 to 20% of water in the extracting agent to reduce the solubility of methyl alcohol in the hydrocarbons. We prefer to use a solution containing about 90% of methyl alcohol and 10% of water for this purpose although other materials may be added if desired.

In extraction of a mixture of normally fluid hydrocarbons and oxygen-containing derivatives any preferred form of apparatus, in which intimate contact of the two phases is provided may be used. Counter-current extraction is desirable but repeated extraction with small quantities of the extracting agent may be satisfactory.

When applied to extraction of liquid mixtures of hydrocarbons and oxygen-containing derivatives, it is desirable to wash the oily phase with water or other suitable solvent to remove methyl alcohol which appears to dissolve to some extent in the hydrocarbons. Although particularly adapted for extraction of liquid mixtures, our process is also adapted to scrubbing of gaseous or vaporous mixtures of hydrocarbons and oxygen-containing derivatives.

As an example of our process a mixture of the following composition which may be taken as characteristic of the product resulting from the direct oxidation of butane according to the above noted application is made up from pure components.

| | Percent |
|---|---|
| Acetaldehyde | 13.8 |
| Acetone | 5.1 |
| Methyl alcohol | 13.6 |
| Ethyl alcohol | 17.2 |
| N-propyl alcohol | 4.5 |
| Iso-propyl alcohol | 19.7 |
| N-butyl alcohol | 3.1 |
| Iso-butyl alcohol | 4.7 |
| Acetic acid | 18.3 |

A solution of 43.27 grams of the above mixture in one litre of pentane is extracted 15 times with a mixture of 88% methyl alcohol and 12% water followed by two extractions of the oily residue with water alone. The volume of the extracting solution was 15 cc. for each extraction and it is found by analysis that 42.78 grams of material has been removed by extraction which represents an efficiency of 98.9%.

We have also found that the efficiency of extraction is increased by carrying out the extraction under pressure above atmospheric, the distribution ratio of butanol between pentane and water, for example, being increased from 4.2:1 to 5.2:1 by increasing the pressure from atmospheric to 2000 pounds per square inch. The distribution ratio may be calculated on the basis of grams butanol/cc. of water divided by grams of butanol/cc. of pentane. A like increase of efficiency is obtained when methyl alcohol-water mixtures are used as solvents and pressure between 1000 and 3000 pounds per square inch is preferably used.

Although our invention is particularly adapted to the extraction of oxygen-containing aliphatic compounds which have been formed by direct oxidation of hydrocarbons with air or oxygen, the invention is not limited to this use but may be successfully applied to the recovery of any oxygen-containing materials which are soluble in both oil and methyl alcohol. It may be used for extraction of a single compound from its mixture with normally fluid hydrocarbons or for the recovery of a mixture of such oxygen-containing materials.

Our process is not to be limited by any theory of the mechanism of the process nor by any examples given merely by way of illustrations, but only by the attached claims in which we wish to claim all novelty inherent in our invention.

We claim:

1. The process of extracting aliphatic oxygen-containing compounds from their mixtures with normally fluid hydrocarbons comprising treating the mixture at superatmospheric pressure with an extraction agent comprising a major quantity of methyl alcohol.

2. The process according to claim 1 in which pressure between 1000 and 3000 pounds per square inch is used.

3. Process of extracting aliphatic oxygen-containing compounds from their mixtures with hydrocarbons, which comprises washing the mixture at super-atmospheric pressure with an extraction agent comprising a major quantity of methyl alcohol.

4. Process according to claim 3, in which the extraction agent contains a sufficient amount of water to cause separation of the methyl alcohol from the hydrocarbons.

5. Process according to claim 3, in which the compounds extracted are derived from high pressure oxidation of hydrocarbons.

6. The process of obtaining aliphatic oxygen-containing derivatives of hydrocarbons from their mixtures with normally fluid hydrocarbons, comprising suitably contacting the mixture under a pressure between 1000 and 3000 pounds per square inch with a solvent comprising a major quantity of methyl alcohol, separating the two phases and washing the hydrocarbon phase with any suitable solvent adapted to remove the extracting agent.

PER K. FROLICH.
JAMES W. PUGH.